(12) United States Patent
Kinose et al.

(10) Patent No.: US 6,365,649 B1
(45) Date of Patent: Apr. 2, 2002

(54) FUSED SPHERICAL SILICA, METHOD FOR PRODUCING SAME AND LIQUID SEALING RESIN COMPOSITION

(75) Inventors: Yutaka Kinose; Shinsuke Miyabe; Takeshi Sakamoto, all of Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/551,599

(22) Filed: Apr. 17, 2000

(30) Foreign Application Priority Data

Jun. 17, 1998 (JP) ............................................. 10-186869

(51) Int. Cl.⁷ .............................. C08K 3/36; C08L 63/02
(52) U.S. Cl. .................. 523/443; 106/287.34; 423/335; 502/233; 523/466
(58) Field of Search .................................. 523/440, 443, 523/466; 524/492, 493, 789; 502/233, 234; 423/335, 336, 337, 338, 339; 436/527; 106/287.34, 481, 482, 490, 494

(56) References Cited

FOREIGN PATENT DOCUMENTS

| JP | 62012609 | * | 1/1987 |
| JP | 2000007319 | * | 1/2000 |

\* cited by examiner

*Primary Examiner*—Robert Dawson
*Assistant Examiner*—D. Aylward
(74) *Attorney, Agent, or Firm*—Armstrong, Westerman & Hattori, LLP

(57) ABSTRACT

The present invention relates to a fused spherical silica having a maximum particle size of 45 $\mu$m, an average particle size of 2 to 10 $\mu$m, and a ratio of a specific surface area $S_{w1}$ of the particles to a theoretical specific surface area $S_{w2}$ of the particles, $S_{w1}/S_{w2}$, of 1.0 to 2.5, the surface of the particles being smooth. The present invention can provide a liquid sealing resin composition having sufficiently low viscosity for sealing a slight gap between a substrate and an IC chip and also having high reliability, and a fused spherical silica filler to be filled therein.

3 Claims, 3 Drawing Sheets

FUSED SPHERICAL SILICA, METHOD FOR PRODUCING SAME AND LIQUID SEALING RESIN COMPOSITION

BACKGROUND OF THE INVENTION

The present invention relates to a liquid sealing resin composition for sealing slight gaps between a substrate and an IC chip and a fused spherical silica which can be used for the composition.

Demand for high performance and functionality in electronic equipment is increasing with the advent of the multimedia age. In view of this, the shape of IC packages used in electronic equipment tends to be small, thin and of a multiple pin structure. Semiconductor chips are molded by sealing the entire IC chip with an sealant in order to protect fine and complicated electronic circuits formed on the surface thereof from dust or moisture in the air. At present, the material that is most commonly used as an sealant for semiconductor IC chip, is an epoxy resin sealant. This epoxy resin sealant is roughly classified into an epoxy resin sealant for transfer molding and a liquid epoxy resin sealant. The sealant mainly used at present is the epoxy resin sealant for transfer molding, and the use of liquid epoxy resin sealant has heretofore been limited.

However, recently this liquid epoxy resin sealant is beginning to be used as an sealant for the most advanced semiconductor devices, for example, P-PGA (Plastic Pin Grid Array), P-BGA (Plastic Ball Grid Array), flip chip or CSP (Chip Size Package or Chip Scale Package). Of these, many CSPs have a smaller and more complicated structure than conventional devices. The gaps between a substrate and an IC chip in CSPs have been conventionally about 75 to 100 $\mu$m. However, in recent years, bump size has become small due to the narrow pitch resulting from a multiple pitch structure, and devices having gaps of about 30 to 50 $\mu$m are becoming more common. In order to seal these very advanced semiconductor devices, a fine process-ability is required, and as a sealant which can meet this requirement, there has been a demand for development of a liquid epoxy resin sealant having excellent gap permeability.

On the other hand, the conventional liquid epoxy resin sealants have a problem in that stress generated due to difference between the coefficients of linear expansion of the liquid sealant and an IC chip need to be reduced in order to increase the reliability of the sealant. As a method for solving this problem, there is a method of decreasing the coefficient of linear expansion by blending a large amount of silica filler in the liquid epoxy resin sealant, and as a method for solving the problem of fluidity due to this blend of large amount of silica filler, many methods have been proposed in which finely fused spherical silica having excellent low viscosity characteristics is used (for example, Japanese Patent Application Laid-open Nos. Hei 2-59416, and Hei 2-199013).

However, it is difficult to say that the conventional liquid epoxy resin encapsulants have high reliability with the possibility of filling a large amount of silica fillers, and also sufficiently have a gap permeability which seals a slight gap between a substrate and an IC chip in the most advanced semiconductor devices. For this reason, development of a liquid epoxy resin encapsulant having high reliability and also having decreased viscosity, and a silica filler for a liquid encapsulant, that imparts this performance from the silica filler side, has been demanded.

Accordingly, an object of the present invention is to provide a liquid sealing resin composition having sufficiently low viscosity for sealing slight gaps between a substrate and an IC chip and also having high reliability, and fused spherical silica filler to be filled therein and a method for producing the fused spherical silica.

SUMMARY OF THE INVENTION

As a result of extensive investigations, it has been found that a liquid sealing resin composition obtained by blending silica particles having specific particle size characteristics obtained by subjecting fused spherical silica to wet treatment under specific conditions to make the surface of the particles smooth, with an epoxy resin or silicone resin which is liquid at normal temperature can overcome the above-described problem, has a sufficient low viscosity for sealing a slight gap between a substrate and an IC chip, and also has high reliability. The present invention has been completed based on this finding.

More specifically, the present invention provides a fused spherical silica having a maximum particle size of 45 $\mu$m, an average particle size of 3 to 10 $\mu$m, and a ratio of the specific surface area $S_{w1}$ of the particles to a theoretical specific surface area $S_{w2}$ of the particles, $S_{w1}/S_{w2}$, of 1.0 to 2.5, the surface of the particles being smooth.

The present invention also provides a method for producing the fused spherical silica, which comprises subjecting to wet treatment a mixture of fused spherical silica formed in oxygen-combustible gas mixed flame and an auxiliary for removing fine particles adhered on the fused spherical silica, thereby separating and removing the fine particles adhered on the surface of the fused spherical silica.

The present invention further provides a liquid sealing resin composition comprising (A) a liquid epoxy or silicone resin, and (B) a fused spherical silica filler having a maximum particle size of 45 $\mu$m, an average particle size of 2 to 10 $\mu$m, and a ratio of th specific surface area $S_{w1}$ of the particles to a theoretical specific surface area $S_{w2}$ of the particles, $S_{w1}/S_{w2}$, of 1.0 to 2.5, the surface of the particles being smooth.

The fused spherical silica filler of the present invention has specific particle size characteristics such that the particle surface is smoothed by subjecting the fused spherical silica to wet treatment under specific conditions. Therefore, the fused spherical silica can be blended in high proportion with an epoxy resin or silicone resin which is liquid at normal temperature, and can minimize the coefficient of linear expansion of a liquid sealing resin composition. As a result, the fused spherical silica can impart high reliability. Further, the liquid sealing resin, even if it contains the fused spherical silica in high proportion, has low viscosity, and therefore has good gap permeability.

DETAILED DESCRIPTION OF THE INVENTION

Figure 1:
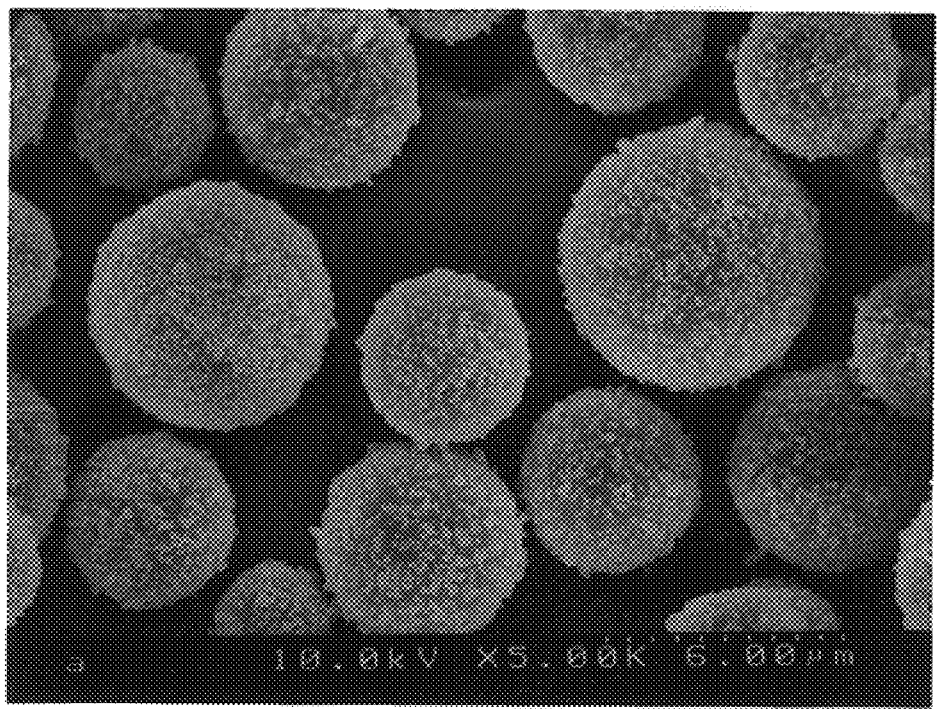
FIG. 1 is an SEM photograph (magnification: 5,000) of the fused spherical silica (a) obtained in Comparative Example 1.

The fused spherical silica of the present invention is spherical shaped particles, and the surface of the particles is very smooth. The particles have a maximum particle size of 45 μm, and preferably 40 μm. By specifying the maximum particle size of the fused spherical silica as 45 μm or less, when a liquid sealing resin composition is formed using same, the resulting composition can sufficiently permeate gaps between a substrate and an IC chip of a CSP. Further, the particles have an average particle size of 2 to 10 μm, and preferably 3.3 to 8.0 μm. If the average particle size of the fused spherical silica exceeds 10 μm, it is difficult to make the maximum particle size 45 μm or less even by classification means. Further, if the average particle size is less than 2 μm, the proportion of particles having a particle size of 1 μm or less increases. As a result, when a liquid sealing resin composition is formed using such particles, the viscosity of the resulting composition increases, and as a result, the gap permeability thereof becomes poor. Measurement of the maximum particle size and average particle size can be conducted using a laser type microtrack particle size analyzer or the like.

The fused spherical silica of the present invention is such that the ratio of a specific surface area $S_{w1}$ of the particles to a theoretical specific surface area $S_{w2}$ of the particles, $S_{w1}/S_{w2}$, is in a range of 1.0 to 2.5, preferably 1.0 to 1.5, and more preferably 1.0 to 1.3. The $S_{w1}/S_{w2}$ value shows that the form of the particles is close to a true sphere as the $S_{w1}/S_{w2}$ value is near 1, and conversely the particle surface becomes rougher as the value becomes larger. The value $S_{w1}$ s obtained by a BET method monosorb specific surface area measurement device. Further, $S_{w2}$ can be obtained by laser method microtrack particle size distribution. Specifically, $S_{w2}$ is obtained by the following equation (1):

$$S_{w2}(m^2/g) = 6/\rho \cdot MA \quad (1)$$

wherein MA indicates an area average particle size (μm), and ρ indicates the specific gravity of silica.

Further, MA is obtained by the following equation (2):

$$MA = \Sigma(n_i a_i d_i)/\Sigma(n_i a_i) \quad (2)$$

In the case that in one powder group, particles having a particle size of $d_1, d_2, \ldots d_i \ldots d_k$ in the order of smaller to larger particles are present in number of $n_1, n_2, \ldots n_i, \ldots n_k$, respectively, and further surface area per particle is $a_1, a_2, \ldots a_i, \ldots a_k$, respectively, and MA is obtained by $MA = (n_1 a_1 d_1 + n_2 a_2 d_2 + \ldots + n_i a_i d_i + \ldots + n_k a_k d_k)/(n_1 a_1 + n_2 a_2 + \ldots + n_i a_i + \ldots + n_k a_k)$.

The smooth surface of the fused spherical silica of the present invention can be confirmed by observation with an electron microscope such as a SEM photograph. For example, in the case that unevenness is not substantially recognized on the particle surface from visual observation of the SEM photograph having a magnification of 5,000, the particle surface is considerably smooth. The phrase "unevenness is not substantially recognized" includes the state in which small amounts of fine particles are dusted on the particle surface.

The fused spherical silica of the present invention can be obtained by wet treating a mixture of fused spherical silica produced in an oxygen-combustible gas mixed flame and an auxiliary for removing fine particles adhered on the fused spherical silica, thereby separating and removing the fine particles adhered on the fused spherical silica surface. In general, the fused spherical silica is produced by introducing raw material silica to an oxygen-combustible gas mixed flame, maintaining the silica at a temperature region not less than its melting point, thereby melting the silica so that the silica having decreased viscosity becomes round due to a surface tension, and then quenching such round silica as is. Since the temperature of an oxygen-combustible gas mixed flame reaches a maximum of 2,700° C. and the melting point and boiling point of silica are about 1,720° C. and 2,400° C., respectively, part of the silica evaporates as SiO in a temperature range not less than boiling point, and the evaporated silica is bonded with oxygen during cooling, thereby fine silica particles having a very fine particle size on the submicron order are produced. In general, the submicron order fine silica particles adhere on the surface of the fused particles, so that the surface of the fused spherical silica has a state similar to "flour" having been dusted over the surface thereof. Regarding the amount of fine particles adhered on the surface of silica, there is no quantitative numerical value, but according to the measurement values of the specific surface area, the different from a theoretical specific surface area of a sphere generally becomes larger as particle size becomes smaller. According to the production method of the present invention, since the fused spherical silica and the auxiliary for removing fine particles adhered on the fused spherical silica surface are mixed and the resulting mixture is subjected to a wet treatment, and fine particles adhered on the fused silica surface are separated and removed from the surface, so that the surface is smoothed.

In the production method of the present invention, the fused spherical silica as a raw material is not particularly limited, and silica having any production history can be used. Examples of the silica which can be used include spherical silica obtained by melting high purity silica gel synthesized by a wet reaction between alkali silicate and mineral acid, spherical silica obtained by melting and grinding natural high purity quartz, spherical silica obtained by flame decomposition oxidizing tetrachlorosilicate and then melting the oxidized product, spherical silica obtained by grinding and burning a gel obtained from an alkoxysilane by a sol-gel method, and fused spherical silica obtained by directly oxidizing metallic silicon. Of these, the fused spherical silica obtained by melting high purity silica gel synthesized by a wet reaction between alkali silicate and mineral acid is preferable.

Specifically, a method is preferable, which comprises preparing high purity silica gel synthesized by a wet reaction between alkali silicate and mineral acid, grinding this high purity silica gel with a grinding machine such as a ball mill or a jet mill, thereby obtaining ground silica gel having an average particle size of, for example, 5 μm, supplying this ground silica gel to a melting furnace to melt it at a temperature not less than melting point of the silica in the oxygen-LPG mixed flame, quenching the fused silica, and collecting the silica with a cyclone to obtain fused spherical silica. If necessary, this fused spherical silica is subjected to classification treatment to obtain fused spherical silica having particle size characteristics of the above range.

The auxiliary for removing fine particles adhered on the fused spherical silica surface, that is mixed with the fused spherical silica is not particularly limited so long as it can achieve the object of the auxiliary which is to separate and remove only the fine particles adhered on the surface of the fused spherical silica particles without grinding the fused spherical silica particles. For example, caustic alkali, hydrofluoric acid and inorganic ground products can be given. Examples of the inorganic ground product are ground products of glass beads, alumina, zirconia, silica beads and the like. Particle size of the ground products is preferably about 10 mm or less. In the case of conducting wet treatment using inorganic ground products, the concentration of the inorganic ground products in a slurry is not particularly limited so long as it is a concentration that allows the inorganic ground products to freely fluidize. Further, a liquid in the case of conducting the wet treatment may be either water alone, or an alkaline or hydrofluoric acid acidic liquid. Where the alkaline or hydrofluoric acid acidic liquid is used, the wet treatment is conducted in the presence or absence of the inorganic ground products. The fine particles adhered on the surface of the fused spherical silica particles are dissolved and removed by using the alkaline or hydrofluoric acid acidic liquid. Where the wet treatment is conducted using the alkaline or hydrofluoric acid acidic liquid, after completion of the treatment it is necessary to remove alkali components or acid components by washing with water. Examples of the caustic soda include NaOH, KOH and LiOH.

An apparatus used in the wet treatment is not particularly limited, and a paint shaker, an attriter and the like are exemplified. After the wet treatment, free adhered fine particles are removed by a decantation or a gradient method, and, on the other hand, the fused spherical silica is filtered off and dried in a conventional method. The surface of the fused spherical silica obtained by such a method is very smooth, and there is a clear difference in the smoothness compared to the surface of the spherical silica before treatment.

In the fused spherical silica of the present invention it is preferable that Na ion and Cl ion as ionic impurities in boiling extraction water are 1 ppm or less, respectively, and U and Th as radioactive impurities are 1 ppb or less, respectively. When the amount of ionic impurities is large, this is known to cause so-called software errors, and in particular, it is necessary to pay attention when it is used for sealing of semiconductor memory devices.

The liquid sealing resin composition comprises (A) an epoxy resin or silicone resin which are liquid at normal temperature, and (B) fused spherical silica filler having a maximum particle size of 45 μm, an average particle size of 3 to 10 μm, and having a ratio of the specific surface area $S_{w1}$ of the particles to a theoretical specific surface area $S_{w2}$ of the particles, $S_{w1}/S_{w2}$, of 1.0 to 2.5, the surface of the particles being smooth, wherein the amount of the component (B) in the composition is 30 to 80 wt %, and preferably 35 to 70 wt %.

The epoxy resin that is liquid at normal temperature used in the present invention is not particularly limited so long as it is a liquid epoxy resin having at least one epoxy group per molecule. Examples of the liquid epoxy resin include liquid phenol novolak type epoxy resins, liquid cresol novolak type epoxy resins, liquid bisphenol A type epoxy resins, liquid bisphenol AD type epoxy resins, liquid bisphenol F type epoxy resins, liquid alicyclic epoxy resins, and glycidyl ethers of 1,1-bis(4-hydroxyphenyl)ethane. These epoxy resins that are liquid at normal temperature can be used alone or as mixtures of two or more thereof.

The silicone resin that is liquid at normal temperature used in the present invention is a polysiloxane represented by, for example, the following formula (1):

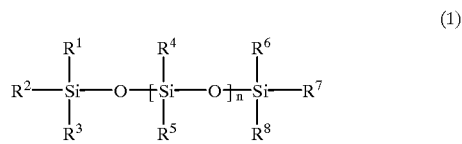

wherein n is 2 to 10,000, $R^1$ to $R^8$ are mainly a methyl group which may be substituted with a hydrogen atom, methyl group, phenyl group, higher fatty acid residue, epoxy-containing group or polyoxyalkylene group, and $R^4$ and $R^5$ may form a cyclic polysiloxane of methylene group. The polysiloxane includes chain that is liquid at normal temperature, partially hydrogenated, cyclic or modified polysiloxanes having a viscosity at 25° C. of 2 to 100 Pa·s (1,000 poise), and preferably 2 to 500 Pa·s (1,000 poise). Examples of the polysiloxane include polydimethylsiloxane oil having a viscosity at 25° C. of 60 poise, polydimethylsiloxane oil having a viscosity at 25° C. of 500 poise, polydimethylsiloxane having a hydroxyl group at the terminals, and polysiloxane having a vinyl group at the terminals.

The liquid sealing resin composition of the present invention can contain other optional components in addition to the above-mentioned component (A) and component (B). Examples of the optional components include curing agents for epoxy resins, curing catalysts and coloring materials. Where the component (A) is an epoxy resin that is liquid at normal temperature, the optional component used is tertiary amines; aromatic hydroxyl group-containing tertiary amines such as 4-(imidazo-1-yl)phenol; curing accelerators such as diazobicyclo compounds; and curing agents such as phthalic anhydride, tetrahydrophthalic anhydride, hexahydrophthalic anhydride, methylhexahydrophthalic anhydride, methyltetrahydrophthalic anhydride and isophthalic anhydride.

The fused spherical silica filler of the present invention can be blended in high proportion with an epoxy resin or silicone resin which are liquid at normal temperature, can minimize coefficient of linear expansion of the liquid sealing resin composition, and therefore has high reliability. Further, since the fused spherical silica has a specific particle size distribution and the particle surface is very smooth, even if the fused spherical silica filler is blended in a large proportion, the resulting liquid sealing resin composition has low viscosity, and therefore has good gap permeability. For this reason, the fused spherical silica filler for liquid encapsulant of the present invention is suitably used as a sealant filler for a CSP having a narrow gap size.

EXAMPLES

The present invention is described below in more detail with reference to the following Examples, but it should be understood that the invention is not limited thereto. Each test item was conducted in the following manner.
(Measurement of average particle size, maximum particle size and theoretical specific surface area)

Measured using a laser type microtrack particle size analyzer (Model: 9320-X100, a product of Nikkiso Co., Ltd.) in the conventional manner.
(viscosity)

Measured using an ELD type rotational viscometer (a product of Tohki Sangyo K.K.) in a temperature constant bath at a predetermined temperature (50° C.) in the conventional manner.
(Specific surface area)

Measured using a BET method monosorb specific surface area measurement device (Flowsorb 2300 Model, a product of Shimadzu Corp.) in the conventional manner.

Example 1 and Comparative Example 1

4,000 g of nitric acid aqueous solution ($HNO_3$: 19.3 wt %) was placed in a reactor equipped with a stirrer, and 6 g of oxalic acid dihydrate salt and 17 g of 35 wt % of hydrogen peroxide were added to the reactor and dissolved. 2,100 g of sodium silicate JIS No. 3 ($Na_2O$: 9.2 wt %, $SiO_2$: 28.5 wt %, $SiO_2/Na_2O$ molar ratio: 3.1) was added to this nitric acid aqueous solution over about 30 minutes to form precipitates of silica. During this addition, the contents in the reactor were sufficiently stirred, and the liquid temperature was maintained at 70 to 80° C. After completion of the reaction, a reaction slurry was stirred at 80° C. for 2 hours to conduct aging. The nitric acid concentration of this mother liquid at this time was 1.1 N. Precipitates of silica were filtered off from the post-reaction slurry, and washed repeatedly, and the precipitates were separated and recovered.

The silica thus separated and recovered was placed in an acid treatment tank equipped with a stirrer, and water and nitric acid were added to the tank for adjustment such that the total slurry amount was 5 liters and the nitric acid concentration in the slurry was 1 N. 6 g of oxalic acid and 17 g of 35 wt % hydrogen peroxide were added to the tank, and the resulting silica slurry was subjected to acid treatment with heating at 90°C. for 3 hours while stirring. Silica was separated from the slurry by filtration, were subjected to repulp washing with water at normal temperature, solid-liquid separation and drying, and then calcined at 900° C. for 2 hours. The content of impurities in the silica was such that all impurities were 5 ppm or less, and U and Th were all 1 ppb or less. Thus, low radioactive high purity silica was obtained. The high purity silica gel was ground with a ball mill such that an average particle size was 15 µm, and further ground with a jet mill grinding machine to obtain fused ground silica gel having an average particle size of 4.8 µm. The fused ground silica gel (water content: 9.5%) was supplied to a melting furnace, and melted in an oxygen-propane gas mixed flame at a temperature of at least the melting point of silica. The fused silica was then quenched and collected with a cyclone to obtain fused spherical silica. The fused spherical silica was air classified with a classifier to obtain fused spherical silica a having an average particle size of 5.35 µm and a specific surface area of 1.46 m²/g. An SEM photograph of the obtained fused spherical silica (a) is shown in FIG. 1 (Comparative Example 1).

Figure 2:
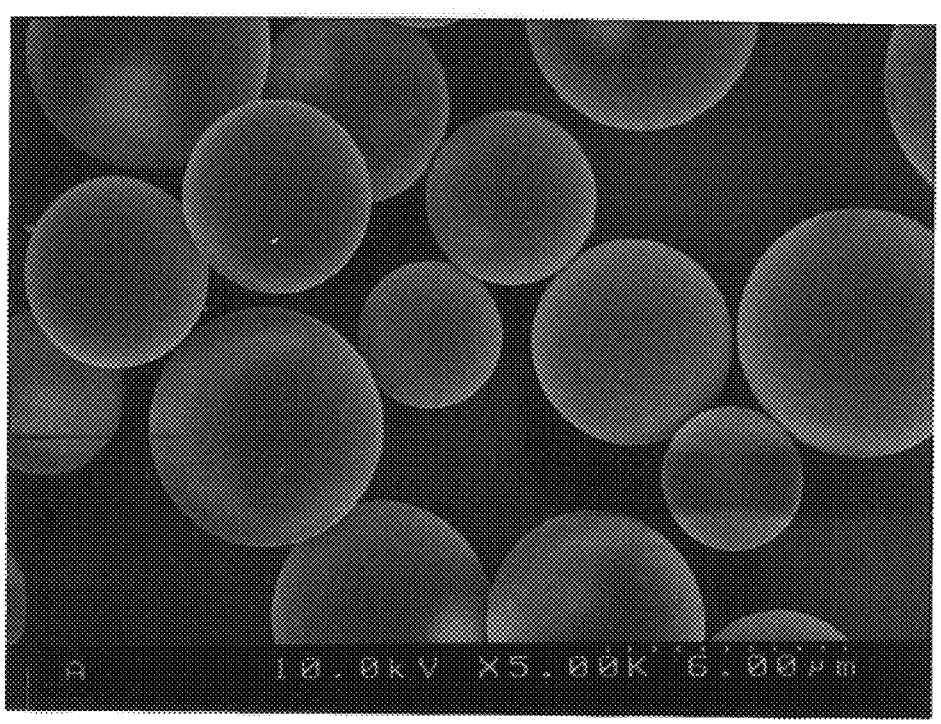
FIG. 2 is an SEM photograph (magnification: 5,000) of the fused spherical silica (A) obtained in Example 1.

20 g of the fused spherical silica a obtained above and 20 g of 5% caustic soda aqueous solution were placed in a 100 ml polymer bottle and mixed with a paint shaker for 15 minutes. The mixture was then subjected to ultrasonic dispersion for 15 minutes and further mixed with a paint shaker for 20 minutes. 50 g of pure water was added to the mixture, and the resulting mixture was allowed to stand for 10 minutes. After removing 50 g of supernatant containing floating fine silica particles, 50 g of pure water was added, and the resulting mixture was allowed to stand. After repeating this procedure three times, filtration and repulp washing were repeated two times, and a filtered cake was dried at 120° C. for2 hours. The dried product was passed through a 150 m sieve to obtain fused spherical silica (A). The fused spherical silica (A) had an average particle size of 5.46 µm and a specific surface area ($S_{w1}$) of 0.52 m²/g. Theoretical specific area ($S_{w2}$) of these particles was 0.500 m²/g, and ($S_{w1}$)/($S_{w2}$) was 1.04. An SEM photograph of these fused spherical silica (A) is shown in FIG. 2. According to the SEM photograph of FIG. 2, the fused spherical silica (A) is such that the fine particles adhered on the particle surface were removed, and it has a very smooth surface.

Example 2 and Comparative Example 2

Figure 3:
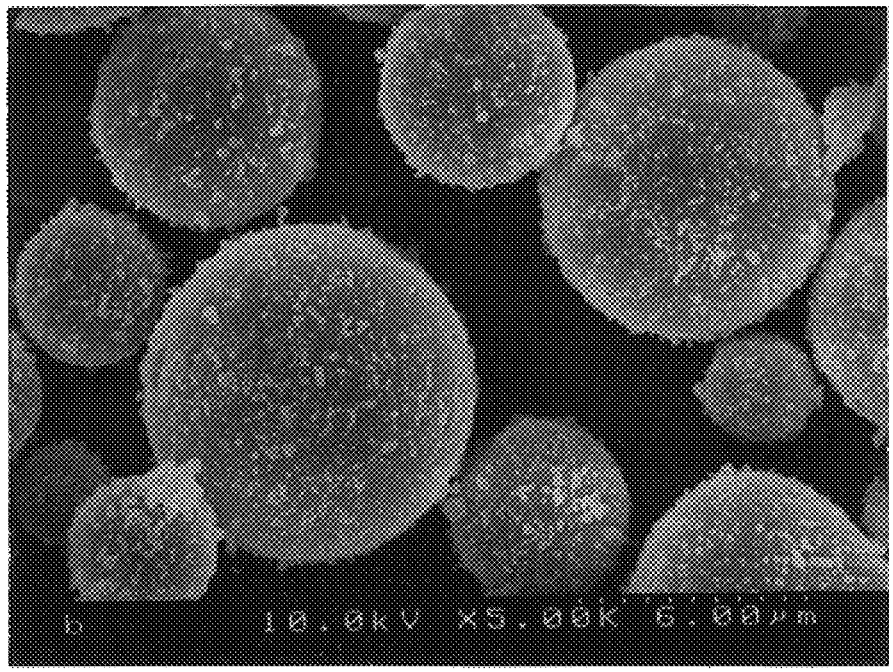
FIG. 3 is an SEM photograph (magnification: 5,000) of the fused spherical silica (b) obtained in Comparative Example 2.

The fused spherical silica (a) obtained in Example 1 was air classified with a classifier to obtain fused spherical silica b having an average particle size of 6.47 µm and a specific surface area of 1.25 m²/g. An SEM photograph of the obtained fused spherical silica (b) is shown in FIG. 3 (Comparative Example 2).

Figure 4:
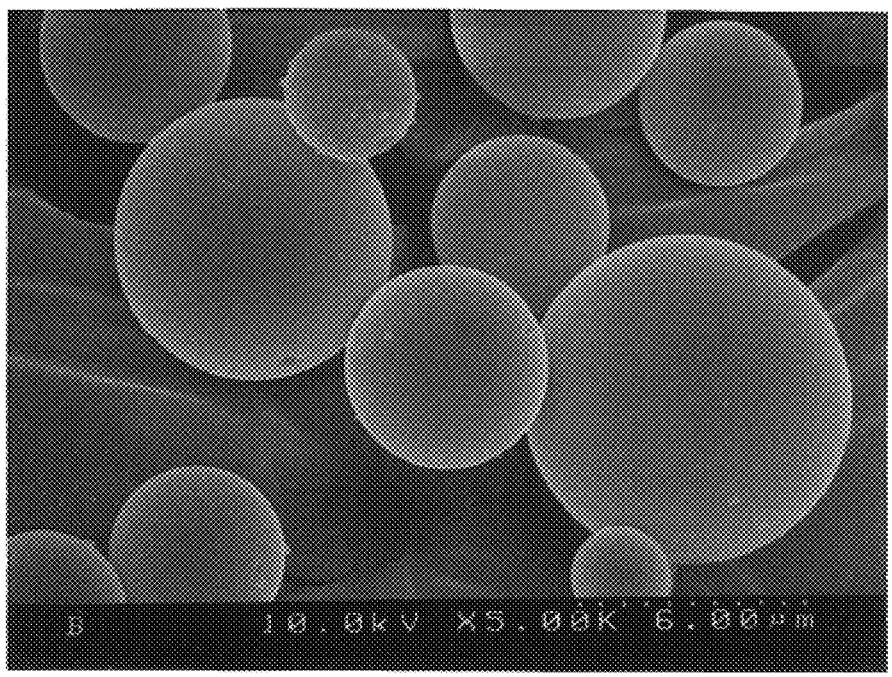
FIG. 4 is an SEM photograph (magnification: 5,000) of the fused spherical silica (B) obtained in Example 2.

30 g of the fused spherical silica b obtained above and 20 g of 5% caustic soda aqueous solution were placed in a 100 ml polymer bottle. The mixture was subjected to dispersion treatment with ultrasonic waves for 15 minutes and further shaken with a paint shaker for 20 minutes. 50 g of pure water was added to the mixture, and the resulting mixture was allowed to stand for 10 minutes. After removing 60 g of supernatant containing floating fine silica particles, 60 g of pure water was added, and the resulting mixture was allowed to stand. After repeating this procedure three times, filtration and repulp washing were repeated two times, and a filtered cake was dried at 120° C. for 2 hours. The dried product was passed through a 150 µm sieve to obtain fused spherical silica (B). The fused spherical silica (B) had an average particle size of 6.53 µm and a specific surface area ($S_{w1}$) of 0.48 m²/g. Theoretical specific area ($S_{w2}$) of these particles was 0.42 m²/g, and ($S_{w1}$)/($S_{w2}$) was 1.14. An SEM photograph of the fused spherical silica (B) is shown in FIG. 4. According to the SEM photograph of FIG. 4, the fused spherical silica (B) is such that fine particles adhered on the particle surface were removed, and it has a very smooth surface.

Example 3 and Comparative Example 3

Figure 5:
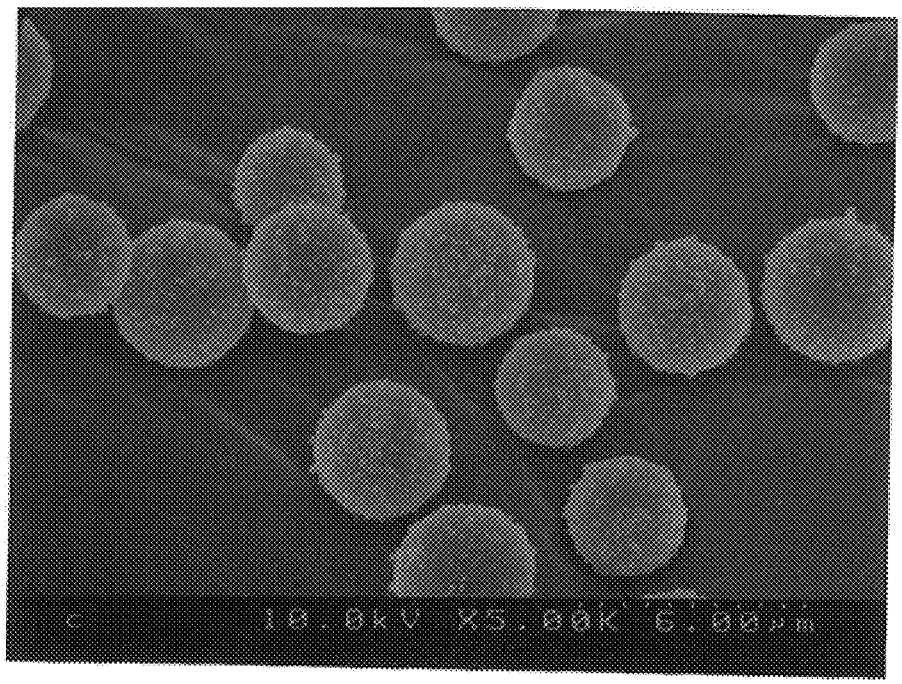
FIG. 5 is an SEM photograph (magnification: 5,000) of the fused spherical silica (d) obtained in Comparative Example 3.

The fused spherical silica a obtained in Example 1 was air classified with a classifier to obtain fused spherical silica c having an average particle size of 3.65 µm and a specific surface area of 3.64 m²/g. An SEM photograph of the obtained fused spherical silica (c) is shown in FIG. 5 (Comparative Example 3).

Figure 6:
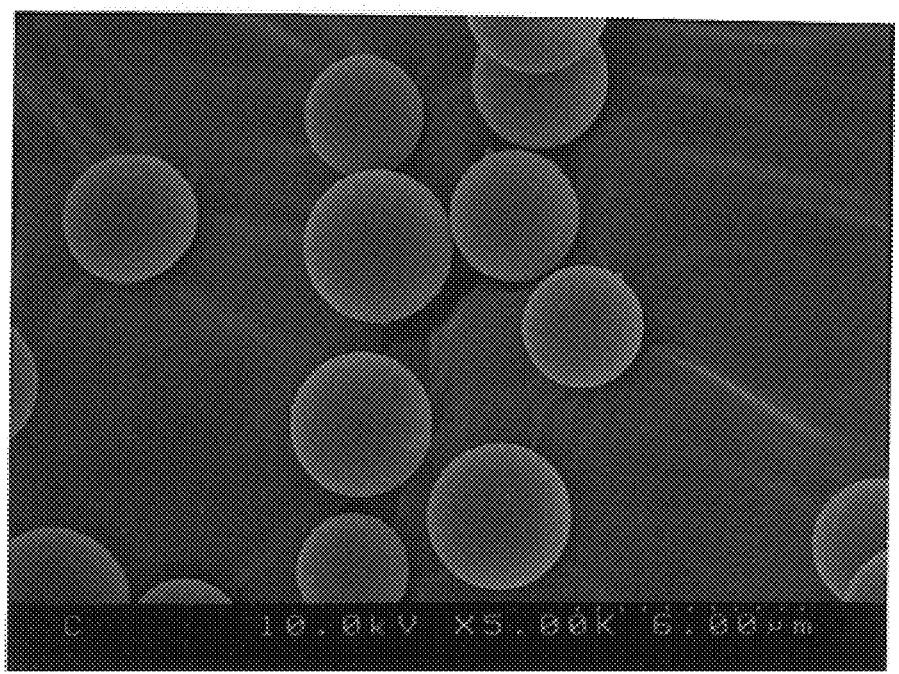
FIG. 6 is an SEM photograph (magnification: 5,000) of the fused spherical silica (D) obtained in Example 3.

30 g of the fused spherical silica (c) obtained above and 30 g of 3.3% caustic soda aqueous solution were placed in a 100 ml polymer bottle. The mixture was subjected to dispersion treatment with ultrasonic waves for 15 minutes and further shaken with a paint shaker for 20 minutes. 50 g of pure water was added to the mixture, and the resulting mixture was allowed to stand for 10 minutes. After removing 60 g of supernatant containing floating fine silica particles, 60 g of pure water was added, and the resulting mixture was allowed to stand. After repeating this procedure two times, the mixture was allowed to stand for one day. After removing 80 g of a supernatant and adding 70 g of pure water, filtration, repulp washing, filtration and water washing were conducted, and a filtered cake was dried at 120° C. for 2 hours. The dried product was passed through a 150 µm sieve to obtain fused spherical silica (C). The fused spherical silica (C) had an average particle size of 3.62 µm and a specific surface area ($S_{w1}$) of 0.96 m²/g. Theoretical specific area ($S_{w2}$) of these particles was 0.75 m²/g, and ($S_{w1}$)/($S_{w2}$) was 1.28. An SEM photograph of the fused spherical silica (C) is shown in FIG. 6. According to the SEM photograph of FIG. 6, the fused spherical silica (C) is such that fine particles adhered on the particle surface were removed, and it has a very smooth surface.

Example 4 and Comparative Example 4

The fused spherical silica (a) and fused spherical silica (A) obtained in Example 1 were each mixed with a liquid epoxy resin having a viscosity at 25° C. of 0.98 Pa·s (9.8 poise) (trade name: EPIKOTE 815, a product of Yuka Shell Epoxy K.K.)(fused spherical silica 70% +liquid epoxy resin 30%), and viscosity at 50° C. of each of the resulting mixtures was measured. The results obtained are shown in the Table below.

TABLE 1

|  | Fused spherical silica (a) | Fused spherical silica (A) |
| --- | --- | --- |
| Average particle size | 5.35 μm | 5.46 μm |
| Specific surface area | 1.46 m$^2$/g | 0.52 m$^2$/g |
| Viscosity | 8.2 Pa · s | 4.5 Pa · s |

From the above Table 1, when the fused spherical silica in which fine particles on the surface thereof have been removed is mixed with a resin, the viscosity of the resulting mixture decreases. Therefore, the fused spherical silica can be suitably used as a silica filler for liquid sealants.

What is claimed is:

1. Fused spherical silica, characterized in that the fused spherical silica has a maximum particle size of 45 μm, an average particle size of 2 to 10 μm, and a ratio of specific surface area $S_{w1}$ of the particles to theoretical specific surface area $S_{w2}$ of the particles, $S_{w1}/S_{w2}$, of 1.0 to 2.5, and that the surface of the particles is smooth.

2. A method for producing fused spherical silica, characterized by subjecting to wet treatment in an aqueous medium a mixture of fused spherical silica formed in oxygen-combustible gas mixed flame and caustic alkali or hydrofluoric acid, to thereby separate and remove the fine particles adhered on the surface of the fused spherical silica.

3. A liquid sealing resin composition comprising (A) an epoxy resin or silicone resin which are liquid at normal temperature, and (B) fused spherical silica filler having a maximum particle size of 45 μm, an average particle size of 2 to 10 μm, and a ratio of a specific surface area $S_{w1}$ of the particles to a theoretical specific surface area $S_{w2}$ of the particles, $S_{w1}/S_{w2}$, of 1.0 to 2.5, the surface of the particles being smooth, characterized in that an amount of the component (B) blended in the composition is 30 to 80 wt %.

* * * * *